R. S. FOOTE.
STARTING OR CRANKING MECHANISM FOR EXPLOSIVE ENGINES.
APPLICATION FILED APR. 28, 1911.
1,000,904.
Patented Aug. 15, 1911.
2 SHEETS—SHEET 2.
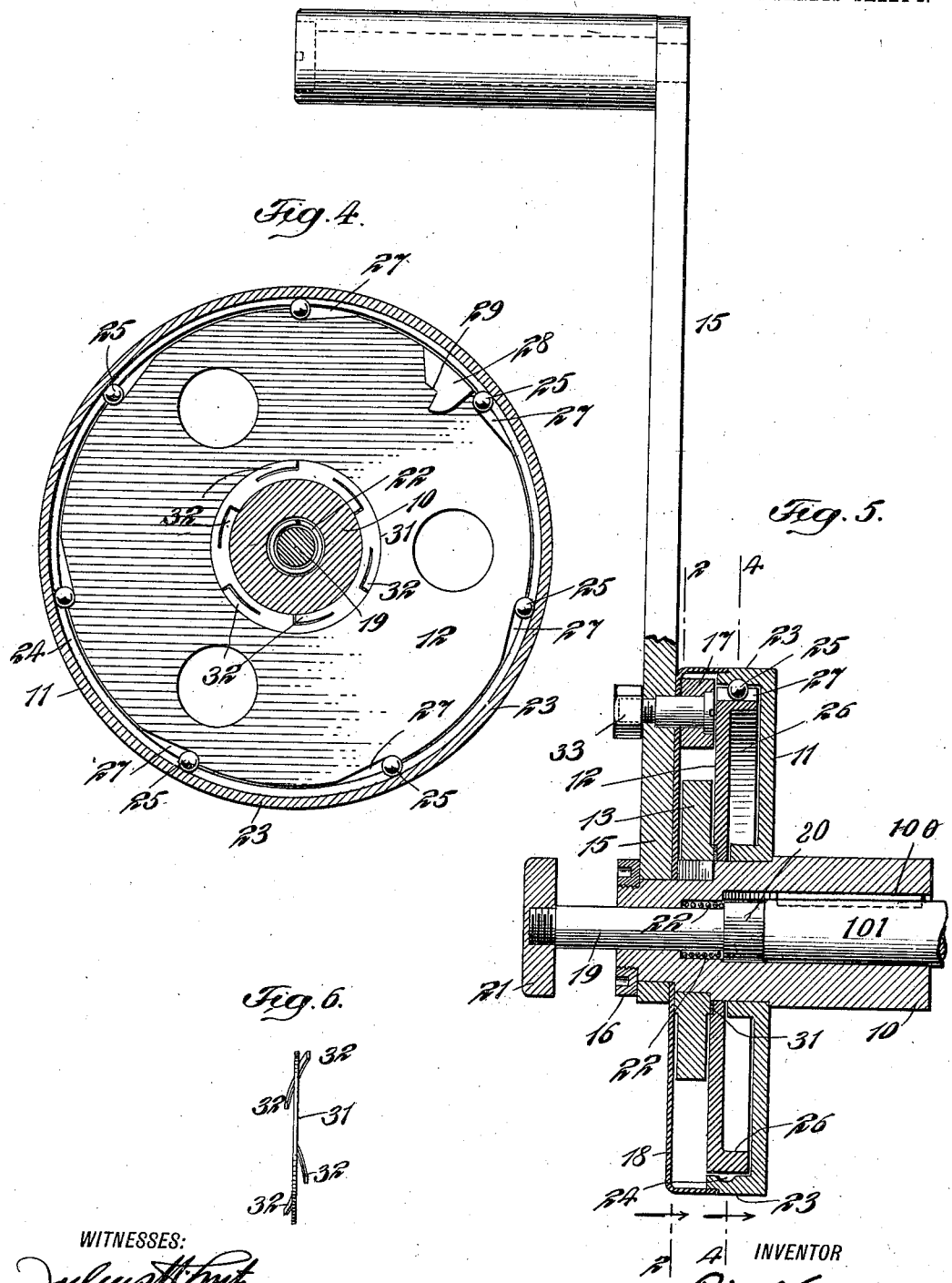
INVENTOR
Robert S. Foote.
BY
ATTORNEY
WITNESSES:

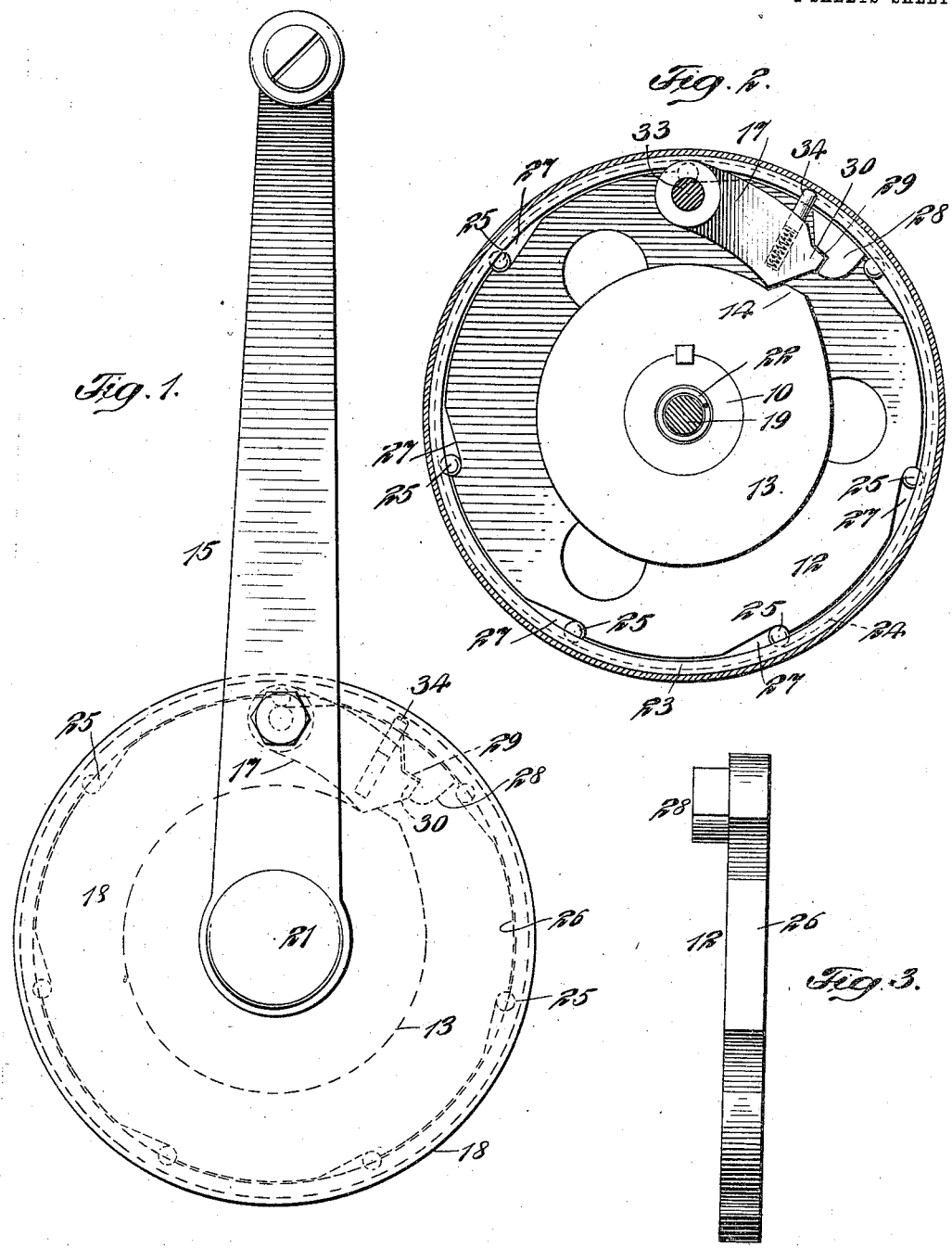

UNITED STATES PATENT OFFICE.

ROBERT S. FOOTE, OF PLAINFIELD, NEW JERSEY.

STARTING OR CRANKING MECHANISM FOR EXPLOSIVE-ENGINES.

1,000,904.  Specification of Letters Patent.  Patented Aug. 15, 1911.

Application filed April 28, 1911. Serial No. 623,911.

*To all whom it may concern:*

Be it known that I, ROBERT S. FOOTE, a citizen of the United States, residing in the city of Plainfield, in the State of New Jersey, have invented new and useful Improvements in Starting or Cranking Mechanisms for Explosive-Engines, of which the following is a specification.

The invention consists in the novel features and mechanism hereinafter described and claimed, whereby a reverse impulse imparted to the engine shaft by a premature explosion in the cylinder will be prevented from affecting the starting-crank or causing it to have a reverse movement.

The object of the invention is to provide a starting or cranking mechanism of improved construction applicable to the shafts of the various types of explosive-engines employed on automobiles, launches and the like, which, while adapted for use in effecting the rotation of the shaft and securing the required compression, is possessed of novel safety features for preventing a premature explosion or a "kick-back", as frequently expressed, from reversing the crank and injuring the operator or causing injury to the mechanism.

The invention will be fully understood from the detailed description hereinafter presented, reference being had to the accompanying drawings, in which:

Figure 1 is a front elevation of a starting mechanism embodying the invention; Fig. 2 is a vertical section through a portion of the same, the section being on the dotted line 2—2 of Fig. 5; Fig. 3 is a detached edge view of a rotary disk constituting one feature of the mechanism; Fig. 4 is a vertical section through the mechanism on the dotted line 4—4 of Fig. 5; Fig. 5 is a vertical section through the mechanism taken at a right angle to the section of Fig. 4, and Fig. 6 is a detached edge view of a friction ring constituting one feature of the mechanism.

The mechanism constituting my invention comprises a sleeve 10 adapted at its inner end to be applied on the usual movable extension or clutch part of the engine shaft, a stationary casing member 11 through which said sleeve freely passes and which will be fastened by screws or otherwise to a suitable part of the automobile or the like employing the mechanism, a rotary member or brake-disk 12 freely mounted on the sleeve 10 and confined within a chamber formed within the casing 11, a disk-plate 13 keyed on the sleeve 10 and having at one part of its periphery a projection 14 affording a shoulder to be engaged by a pawl hereinafter referred to, a crank 15 pivotally mounted on the outer end of the sleeve 10 and detachably secured thereon by means of a nut 16, and a pawl 17 pivotally secured to the crank 15 and arranged in the vertical plane of the disk 13 so as to engage the shoulder thereon furnished by the projection 14, as shown in Fig. 2. The chamber formed within the casing 11 may and preferably will be closed by means of a cap 18 which is free to rotate with the crank 15 and shields the working parts of the mechanism from dirt and the like.

The sleeve 10 is formed with a key-way 100 (Fig. 5) enabling it to be keyed to the short clutch section or extension 101 of an engine-shaft, and said sleeve is provided with a longitudinal rod 19 having an inner head 20 and an outer head 21. The rod 19 extends freely through a longitudinal opening in the outer end of the sleeve 10 and between the head 20 thereon and an annular shoulder formed on said sleeve is confined a spring 22.

The casing member 11 is in the form of a disk having an outwardly projecting lateral annular flange or rim 23 along its periphery and this flange snugly receives the rotary disk member 12 and is formed with an annular runway 24 for a series of rollers or balls 25.

The disk member 12 is formed with an inwardly projecting annular flange or rim 26 in close relation to the outwardly projecting flange or rim 23 of the casing 11 and having a series of corresponding recesses 27 which, as clearly illustrated in Figs. 2 and 4, incline outwardly from their rear to their forward ends, thereby creating in connection with the annular runway 24 chambers of decreasing depth toward their forward ends, or the ends which are forward during the proper rotation of the disk, to receive the balls 25, one ball being in each of said recesses. The disk 12 may rotate in a forward or clockwise direction with the crank, the balls 25 at such time traveling along the runway 24 with said disk, but said balls 25 on any reverse impulse imparted to said disk will become wedged between the disk and casing 11 and operate as a brake to hold said disk stationary. The balls 25 may only travel freely with the disk 12 when they are in the deeper portions of the recesses 27 and drawn along by the back walls of said recesses. The disk 12 is formed on one face near its periphery with a laterally projecting shoulder 28 which stands in the path of the pawl 17 and during the forward turning of the crank 15 is engaged by the forward end of said pawl and travels with its disk 12 therewith. The shoulder 28 has an undercut recess 29 to receive a nose 30 on the forward end of the pawl 17 and retain said pawl in operative relation to the disk 13 and against the projection 14 thereon. The disk 12 is preferably formed with a series of holes 36 through it for the purpose of enabling the casing 11 to be conveniently fastened by screws to the automobile, said holes 36 performing no function other than serving as a convenience in applying the mechanism to an automobile.

The disk 13 is a circular plate keyed on the sleeve 10 and having the aforesaid projection 14 affording a shoulder to receive the lower forward edge of the pawl 17. In order to preserve the relation of the shoulder 28 and projection 14 to each other under normal conditions, I provide on the sleeve 10 between the disks 12, 13 a ring 31 having a series of spring lips 32 bent in opposite directions therefrom. The ring 31 is illustrated more clearly in Figs. 4 and 6 and operates as a friction device to preserve a normal relation of the disk 12 with the disk 13 or, in other words, to prevent the disk 12 from having a forward movement due to vibration or otherwise tending to carry its shoulder 28 from the pawl 17 and in advance of the projection 14 on the disk 13.

The pawl 17 is pivotally mounted upon a bolt or the like 33 carried by the crank 15, and said pawl, as shown in Fig. 2, normally engages the projection 14 on the disk 13 and the shoulder 28 on the disk 12. The pawl 17 is provided with a spring-pressed pin 34 whose outer end impinges against the rim of the cap 18. The tendency of the spring-pin 34 is to retain the pawl 17 with a spring pressure against the disk 13, and said pin 34 on any reverse movement of the disk 13 will on the escape of the pawl from the shoulder 28 allow the pawl to turn outwardly from said disk so as to permit the passage by it of the projection 14 thereon, thereby enabling the disk to rotate on its reverse motion, should occasion render that action necessary, without said disk communicating its motion through the pawl 17 to the crank 15, whereby the latter is enabled to remain stationary on such reverse motion of the disk 13 with the engine-shaft.

The head 20 on the plunger-rod 19 may vary in thickness and the intention is that it will, by the spring 22, be lightly pressed against the outer end of the usual movable extension or clutch part 101 of the engine-shaft, confined in and keyed to the sleeve 10. When it is desired to couple the movable extension or clutch part of the engine-shaft to the main part thereof, the rod 19 will be pressed inwardly to effect such engagement, and thereupon the crank 15 may be turned to rotate said shaft and start the engine. The rod 19 is shown in its normal outer position or the one it would occupy in the non-operating condition of the crank 15.

The operation of the mechanism will largely be understood from the description hereinbefore presented. When it is desired to start or crank the engine, the rod 19 will be pressed inwardly to effect the engagment of the mechanism with the engine-shaft, and thereupon the crank 15 will be turned as usual. The forward movement of the crank 15 causes the pawl 17 to rotate the disks 12, 13 together and the movement of the disk 13 is imparted to the engine-shaft, while the disk 12 on its rotation serves through the shoulder 28 to keep the pawl in engagement with the projection 14 on said disk 13. In the event, during the cranking, of a premature explosion or "kick-back" and the sudden reversal of the engine-shaft, said shaft will then reverse the movement of the disk 13, but this will not result in a reversal of the crank 15 since under such condition said disk will almost immediately cause the pawl 17 to leave the shoulder 28 and turn outwardly, with the result that the disk 13 and engine-shaft may rotate freely in their reverse action without affecting the crank 15, which is not keyed but pivotally mounted or swiveled on the sleeve 10. The disk 12 will not follow the disk 13 on the reverse movement of the latter, being prevented from so doing by the action of the balls 25 and the surfaces confining them.

I do not limit my invention to all of the details of form and construction shown and described nor otherwise than as may be indicated by the claims.

What I claim as my invention and desire to secure by Letters-Patent, is—

1. A starting mechanism for connection with the shaft of an explosive engine comprising a member affording a circular runway, a coöperating member having a series of inclined recesses facing said runway, and a series of rollers, as balls, in said runway and recesses, one of said members being stationary and the other freely rotary, combined with a plate connected with the movable extension of the engine-shaft and having a shoulder thereon, a shoulder on said rotary member to coöperate with the shoulder on said plate, a crank, a pivoted pawl carried by the crank in normal engagement with both of said shoulders and adapted on the forward turning movement of the crank to rotate said rotary member and said plate with the engine-shaft and to release said plate on a reverse movement of said shaft, the shoulder on said rotary member having an undercut recess to receive the nose of said pawl, and said pawl being provided with means normally pressing it against said plate, and means for moving said movable extension into engagement with the engine-shaft; substantially as set forth.

2. A starting mechanism for connection with the shaft of an explosive engine comprising a member affording a circular runway, a coöperating member having a series of inclined recesses facing said runway, and a series of rollers, as balls, in said runway and recesses, one of said members being stationary and the other freely rotary, combined with a plate connected with the movable extension of the engine-shaft and having a shoulder thereon, a shoulder on said rotary member to coöperate with the shoulder on said plate, a crank, a pivoted pawl carried by the crank in normal engagement with both of said shoulders and adapted on the forward turning movement of the crank to rotate said rotary member and said plate with the engine-shaft and to release said plate on a reverse movement of said shaft, said plate and rotary member facing each other and said mechanism being provided with means frictionally but not rigidly binding said plate and rotary member together, and means for causing said movable extension to engage the engine-shaft; substantially as set forth.

3. A starting mechanism for connection with the shaft of an explosive engine comprising a sleeve for application to the movable extension of said shaft, a rigid casing member having a lateral circular flange affording a runway, a coöperating rotary disk member having a laterally projected circular flange within and concentric with the flange on said rigid member and formed with a series of inclined recesses facing said runway, a series of rollers, as balls, in said runway and recesses, a plate rigidly connected with said sleeve and having a shoulder thereon, a shoulder on said rotary member to coöperate with the shoulder on said plate, a crank pivoted on said sleeve, a pivoted pawl carried by the crank in normal engagement with both of said shoulders and adapted on the forward turning movement of the crank to rotate said rotary member and said plate with the engine-shaft and release said plate on a reverse movement of said shaft, said rotary member and said plate being in face to face relation with each other, a friction ring between and engaging the facing sides of said rotary member and plate, and a plunger arranged to force said movable extension into engagement with the engine-shaft; substantially as set forth.

ROBERT S. FOOTE.

Witnesses:
 MARY C. A. FOOTE,
 NELSON RUNYON.